US008553746B2

(12) United States Patent
Bolourchi et al.

(10) Patent No.: US 8,553,746 B2
(45) Date of Patent: *Oct. 8, 2013

(54) METHOD AND SYSTEM FOR CODE REUSE AND CAPACITY ENHANCEMENT USING NULL STEERING

(75) Inventors: Nadar Bolourchi, Larchmont, NY (US); Leonid Kazakevich, Plainview, NY (US); Rui Yang, Greenlawn, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,635

(22) Filed: Apr. 3, 2012

(65) Prior Publication Data
US 2012/0189035 A1     Jul. 26, 2012

Related U.S. Application Data

(60) Continuation of application No. 12/329,516, filed on Dec. 5, 2008, now Pat. No. 8,149,895, which is a continuation of application No. 11/731,617, filed on Mar. 30, 2007, now Pat. No. 7,469,021, which is a division of application No. 10/284,741, filed on Oct. 31, 2002, now Pat. No. 7,218,684.

(60) Provisional application No. 60/335,616, filed on Nov. 2, 2001.

(51) Int. Cl.
H04B 1/00 (2006.01)
(52) U.S. Cl.
USPC .......................................... 375/142; 375/130

(58) Field of Classification Search
USPC ......... 375/142, 130, 141, 267, 295, 304, 347; 342/153, 347, 367, 368; 455/456, 562
See application file for complete search history.

(56) References Cited

U.S. PATENT DOCUMENTS

| 4,771,289 A | 9/1988 | Masak |
| 5,768,307 A | 6/1998 | Schramm et al. |
| 6,115,406 A | 9/2000 | Mesecher |

(Continued)

FOREIGN PATENT DOCUMENTS

| EP | 1 191 706 A2 | 3/2002 |
| JP | 2001-127699 | 5/2001 |
| JP | 2001-169344 | 6/2001 |
| WO | 01/71928 | 9/2001 |
| WO | 01/76110 | 10/2001 |

OTHER PUBLICATIONS

Kishiyama et al. "Weight Estimation for Downlink Null Steering in a TDD/SDMA System" 2000 IEEE.

(Continued)

Primary Examiner — Khai Tran
(74) Attorney, Agent, or Firm — Volpe and Koenig, P.C.

(57) ABSTRACT

The number of users and data capacity of wireless systems are increased by employing apparatus and method for increasing the number of spreading codes available in the system by providing a mechanism to reuse the already allocated spreading code or use the codes that may correlate to those already being used within the same sector/cell. This, in return, provides capacity improvement proportional to the number of added base station (BS) antennas for each cell. An antenna null steering technique for code allocation maintains the cross correlation properties of the codes only for the desired user and to obtain a gain in capacity improvement.

8 Claims, 2 Drawing Sheets

(56) References Cited

U.S. PATENT DOCUMENTS

| | | |
|---|---|---|
| 6,463,296 B1 | 10/2002 | Esmailzadeh et al. |
| 6,633,600 B2 | 10/2003 | Lomp et al. |
| 6,748,024 B2 | 6/2004 | Kuchi et al. |
| 7,130,663 B2 | 10/2006 | Guo |
| 7,164,725 B2 | 1/2007 | Frank |
| 7,218,684 B2 | 5/2007 | Bolourchi et al. |
| 7,469,021 B2 * | 12/2008 | Bolourchi et al. ............ 375/304 |
| 2001/0038666 A1 | 11/2001 | Mesecher et al. |
| 2002/0044591 A1 | 4/2002 | Lee et al. |
| 2002/0155818 A1 | 10/2002 | Boros et al. |
| 2003/0092456 A1 | 5/2003 | Dent |
| 2005/0192058 A1 * | 9/2005 | Jung et al. .................. 455/562.1 |

OTHER PUBLICATIONS

Jotten et al. "Comparison of Transmit Array Algorithms for Code Division Multiple Access downlinks Operating in the Frequency Division Duplexing Mode" Research Group for RF Communications, University of Kaiserslautern, 2001 IEEE, pp. E-16-E-21.

Nishimura et al. "Downlink Beamforming Performance for an SDMA Terminal with Joint Detection." IEEE VTC, Oct. 11, 2001, vol. 3, pp. 1538-1542.

Nishimura et al. "SDMA Downlink Beamforming for a MIMO Channel." The Institute of Electronics, Information and Communication Engineers, Oct. 2001. (English Abstract Only).

\* cited by examiner

METHOD AND SYSTEM FOR CODE REUSE AND CAPACITY ENHANCEMENT USING NULL STEERING

CROSS REFERENCE TO RELATED APPLICATIONS

This application is a continuation of U.S. patent application Ser. No. 12/329,516 filed Dec. 5, 2008, which issued as U.S. Pat. No. 8,149,895 on Apr. 3, 2012, which is a continuation of U.S. patent application Ser. No. 11/731,617 filed Mar. 30, 2007, which issued as U.S. Pat. No. 7,469,021 on Dec. 23, 2008, which is a divisional application of U.S. patent application Ser. No. 10/284,741, filed Oct. 31, 2002, which issued as U.S. Pat. No. 7,218,684 on May 15, 2007, which claims the benefit of U.S. Provisional Application Ser. No. 60/335,616, filed Nov. 2, 2001, which are incorporated by reference as if fully set forth.

FIELD OF THE INVENTION

The present invention relates to the field of wireless communication. More specifically, the present invention relates to increasing the number of users and data capacity and data rate of wireless systems. More specifically, in order to increase the capacity, the present invention employs a system which allows the same or correlated signatures to be used for different users simultaneously during the operation of the system.

BACKGROUND OF THE INVENTION

Traditionally, the capacity of Code Division Multiple Access (CDMA) systems, the number of users simultaneously supported in a cell and the data rate allocated to the users, are dependent on availability of the spreading codes functioning as user's signatures, and their cross-correlation properties. If one code is assigned to a user, it cannot be used for the other uses at the same time. This rule is adopted even for the systems with multiple transmission antennas which generates beam steering (beam forming) as a means of interference reduction. Although the current beam steering technology can achieve certain capacity enhancement, the result (of capacity enhancement) is quite limited since the interference cannot be completely removed to a specific location in the field. In addition, from an implementation point of view, such a multiple antenna system is quite complex.

SUMMARY OF THE INVENTION

This invention provides a mechanism to allow reusing the already allocated spreading code or using the codes that may correlate to those already being used within the same sector and/or cell. This in return provides capacity improvement proportional to the number of added Base Station antennas for each cell. The present invention employs an antenna null steering technique for code allocation to maintain the cross correlation properties of the codes only for the desired user and to gain capacity improvement.

BRIEF DESCRIPTION OF THE INVENTION

The present invention will be understood when reading the accompanying description and drawings, wherein like elements are designated by like numerals, and wherein.

DETAILED DESCRIPTION OF THE INVENTION AND THE PREFERRED EMBODIMENTS THEREOF

The present invention uses a simple antenna null steering technique for suppressing the power of the undesired interference signals, which may use the same or correlated spreading codes, at a desired receiver. Since the spreading codes can be reused simultaneously, the capacity of the whole system can be increased. The simplicity and ease of implementation is one advantage of the null steering method. However, due to the ease of implementation, the null steering technique can be used as a complementary method along with beam steering to provide further improvement of system capacity.

The concept may use different spreading codes, users and antennas. However, the present invention is described using the same or correlated spreading code for N users simultaneously, utilizing N+1 antennas. Channel information such as the spatial information is used by N+1 antennas of a Base Station BS to create a null at all user locations with the identical or correlated spreading code but the desired one. The concept is illustrated below for the case where N=2, where N=the number of users.

Figure 1:
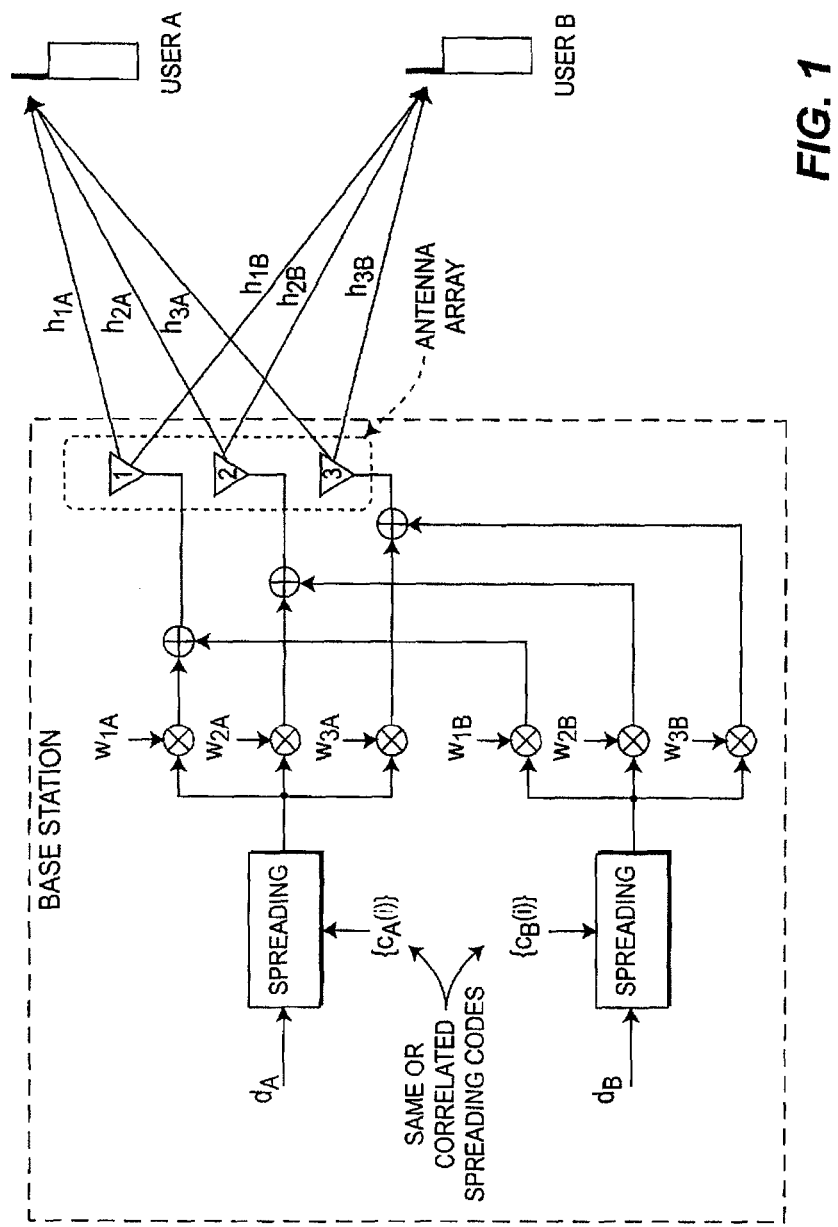
FIG. 1 is a schematic diagram of a processing unit embodying the principles of the present invention.

Considering a two-user case. The system is depicted in FIG. 1, where, for i=1, 2, 3, $h_{iA}$ and $h_{iB}$ represent the channel impulse responses from antenna i to user A and user B, respectively. $d_A$ and $d_B$ indicate the data transmitted to the user A and B, respectively. Note that data $d_A$ and $d_B$ are spread by the same or correlated codes $\{c_A(k), k=1,2, \ldots\}$ and $\{c_B(k), k=1,2, \ldots\}$ before data transmission at the base station. Our objective is to transmit information for user A without creating any interference to user B and, at the same time, transmit information for user B without creating any interference to user A. This objective is achieved by creating a null at the location of user B by altering the composite channel impulse response from BS to user A and creating a null at the location of user A by altering the composite channel impulse response from BS to user B. Here the composite channel impulse response is defined as a transfer function from spreader output at the BS to the antenna user's receiver unit.

To create a null at user B, we will select the complex weights, $W_{1A}$, $W_{2A}$ and $W_{3A}$ so that the gain of the composite channel from the base station to user A is maximized and the composite channel gain from the base station to user B is 0.

Mathematically, it is a constraint optimization problem, which can be expressed as follows:

$$\max_{w_{1A},w_{2A},w_{3A}} \left(\sum_{i=1}^{3} w_{iA} h_{iA}\right)^* \left(\sum_{i=1}^{3} w_{iA} h_{iA}\right) \quad \text{Equation 1}$$

$$\text{subject to } \sum_{i=1}^{3} w_{iA} h_{iB} = 0$$

Similarly, to create a null at user A, we will select the complex weights, $w_{1B}$, $w_{2b}$ and $w_{3b}$ so that the gain of the composite channel from the base station to user B is maximized and the composite channel gain from the base station to user A is 0. Mathematically, it is likewise a constraint optimization problem, which can be expressed as follows:

$$\max_{w_{1B}, w_{2B}, w_{3B}} \left(\sum_{i=1}^{3} w_{iB} h_{iB}\right)^* \left(\sum_{i=1}^{3} w_{iB} h_{iB}\right) \quad \text{Equation 2}$$

$$\text{subject to } \sum_{i=1}^{3} w_{iB} h_{iA} = 0$$

The optimization problem described above can be easily solved. Next, as an example, we show how to determine $w_{1A}$, $w_{2A}$ and $w_{3A}$ from Equation 1. First from the constraint in Equation 1, we choose $w_{3A}$ as follows:

$$w_{3A} = -\frac{w_{1A} h_{1B} + w_{2A} h_{2B}}{h_{3B}} \quad \text{Equation 3}$$

Applying $w_{3A}$, the composite channel impulse response at user A becomes:

$$w_{1A} g_1 + w_{2A} g_2; \quad \text{Equation 4}$$

where, $$g_i = h_{iA} - \frac{h_{3A}}{h_{3B}} h_{iB} \text{ for } i = 1, 2 \quad \text{Equation 5}$$

In general, $g_i$ is a complex number. Define $g_i = a_i e^{j\phi_i}$ for $i=1, 2$; where $a_i > 0$ for $i=1, 2$. Also, define $$w_{iA} = e^{j\theta_i} \text{ for } i=1,2.$$

It can be shown that the channel gain of the composite channel impulse response from the base station to user A is $$\left(\sum_{i=1}^{3} w_{iA} h_{iA}\right)^* \left(\sum_{i=1}^{3} w_{iA} h_{iA}\right) = \quad \text{Equation 6}$$
$$a_1^2 + a_2^2 + 2a_1 a_2 \cos(\theta_2 - \theta_1 + \phi_2 - \phi_1)$$

It is clear that, to reach the maximum possible gain, we should have:

$$\theta_2 - \theta_1 + \phi_2 - \phi_1 = 0 \quad \text{Equation 7}$$

One approach to satisfy the above equation is to choose:

$$w_{iA} = \frac{1}{a_i} g_i^* \text{ for } i = 1, 2 \quad \text{Equation 8}$$

Figure 2:
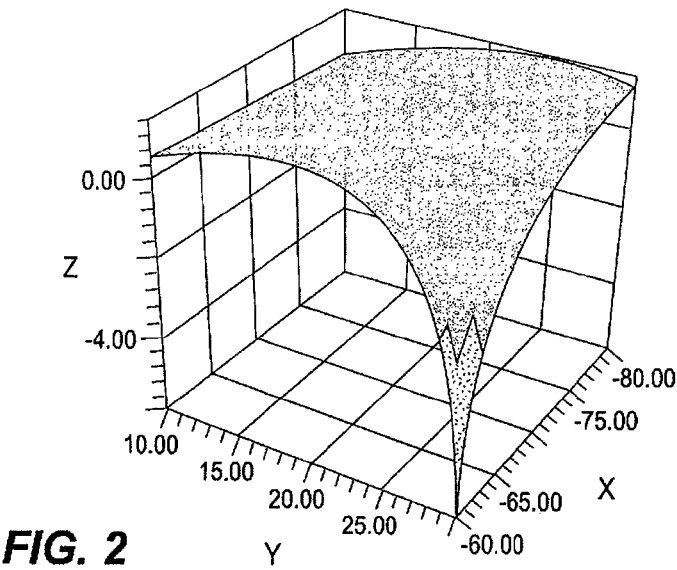
FIG. 2 is a three-dimensional diagram of the combined channel power profiles as calculated in accordance with a mathematical example of the present invention.
Figure 3:
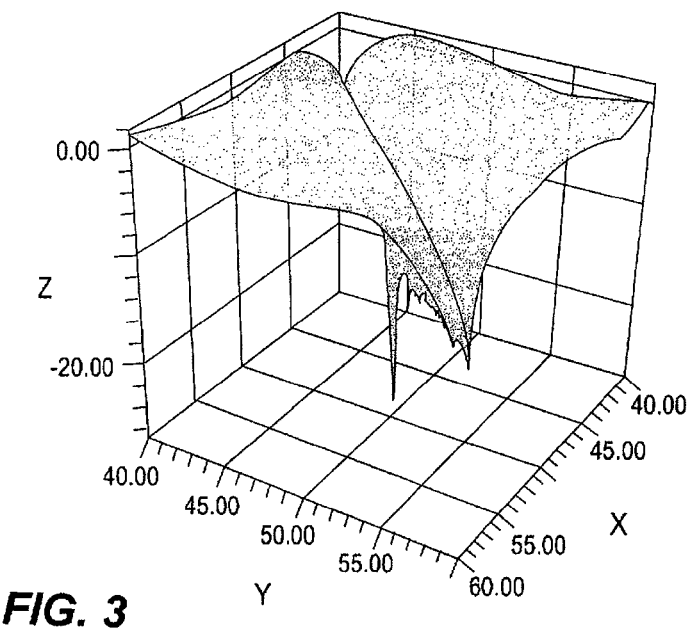
FIG. 3 is a three-dimensional diagram of the combined channel power profiles as calculated in accordance with a mathematical example of the present invention.

For example, define a simplified channel model as $$h_{ip} = \exp\left(j 2\pi \frac{D_{ip}}{\lambda}\right); \quad \text{Equation 9}$$

for $i=1, 2, 3$, and $p=A, B$, where $D_{ip}$ is the distance from user p to antenna i, and $\lambda$ is the wavelength, which is 0.15 m in this example. In addition, we assume that the three (3) antennas are distributed along the X axis in a OXY plane with space between two adjacent antennas being 0.75 m and antenna 2 being placed at the origin (O) of the OXY plane. We choose the location for user A being $(x_A, y_A) = (-70, 20)$ and user B being $(x_B, y_B) = (50, 50)$. The composite channel power profiles (in dB) near these two points are shown in FIG. 2 and FIG. 3, respectively. Thus, by generating the complex values $w_{1A}$, $w_{2A}$ and $w_{3A}$, the desired user A, in the example of FIG. 1, will receive the communication with maximum power (FIG. 2) whereas the power at the other user will be nulled (FIG. 3).

What is claimed is:

1. A base station employing null beam steering of wireless communication signals to a plurality of users, comprising:
    an antenna array having a plurality of antennas;
    a spreading code generator for selecting spreading codes for the plurality of users that correlate to spreading codes already being used with the same cell;
    a plurality of weight modulators for modulating data $d_i$, for $i=1, \ldots, N$, intended for one of N users with N+1 complex weights $w_i$, for $i=1, \ldots, N+1$, each modulated signal being directed to one of the N+1 antennas;
        wherein the complex weights are selected to create a null at one of the plurality of users, such that a gain of a composite channel from the base station to the nulled user is zero and a gain of a composite channel from the base station to another user is maximized;
        wherein each element of the complex weights is a function of the channel impulse responses from the antenna array to locations of the users; and
    a summer for summing the weight modulated data signals.

2. The base station of claim 1, wherein the weight modulator is configured to generate complex weights $w_i$ as a function of the number of antennas in the array.

3. The base station of claim 1, wherein the antenna array is comprised of at least three antennas.

4. A method implemented by a base station employing null beam steering, transmitting data to N users, including data $d_A$ to a first user A and data dB to second user B, wherein the user A and the user B are located within a given cell or sector and positioned at different angular directions relative to the base station, the base station transmitting the data $d_A$ and the data $d_B$ over an antenna array having N+1 antennas, comprising:
    simultaneously applying one of a same and a correlated spreading code to the data $d_A$ and the data $d_B$;
    separately applying the data $d_A$ and the data dB with first and second different sets of complex weights where each set of weights includes N+1 complex weight modulators $w_i$ (for $i=1, 2, \ldots N+1$), each weight modulator having an output signal directed to one of the N antennas; wherein each weight modulator is a function of the channel impulse responses from the antenna array to locations of each of user A and user B;
    selecting the complex weights to create a null at one of user A and user B, such that a gain of a composite channel from the base station to the nulled user is zero and a gain of a composite channel from the base station to the other user is maximized;
    summing the weight modulated data signals intended for each of the user A and the user B; and
    transmitting the summed signals from the antenna array to the user A and the user B.

5. The method of claim 4 wherein the complex weight modulators $w_i$ of the first and second sets of complex weights are applied to specific ones of the N antennas.

6. The method of claim 4 further comprising arranging the antennas in the antenna array in a linear manner.

7. The method of claim 6 further comprising spacing the antennas at the base station by predetermined distances.

8. The method of claim 6 further comprising spacing the antennas at the base station by 0.75 meters.

\* \* \* \* \*